(12) United States Patent
Schaumann

(10) Patent No.: US 6,904,804 B2
(45) Date of Patent: Jun. 14, 2005

(54) DEVICE FOR MEASURING ACCELERATION

(75) Inventor: Arno Schaumann, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/312,544

(22) PCT Filed: Apr. 9, 2002

(86) PCT No.: PCT/DE02/01292

§ 371 (c)(1),
(2), (4) Date: Sep. 22, 2003

(87) PCT Pub. No.: WO02/088758

PCT Pub. Date: Nov. 7, 2002

(65) Prior Publication Data

US 2004/0045355 A1 Mar. 11, 2004

(30) Foreign Application Priority Data

May 2, 2001 (DE) ......................................... 101 21 391

(51) Int. Cl.[7] .......................... G01P 15/18; G01P 15/125
(52) U.S. Cl. .............................. 73/514.32; 73/514.16; 73/862.04; 73/2

(58) Field of Search .................. 73/514.01, 514.16, 73/514.32, 514.35, 862.042

(56) References Cited

U.S. PATENT DOCUMENTS 5,441,300 A * 8/1995 Yokota et al. ............... 280/735
5,939,633 A * 8/1999 Judy ........................ 73/514.32

OTHER PUBLICATIONS

Ahman et al.; "A Two–Dimensional Micromachined Accelerometer" IEEE Transactions on Instrumentation and Measurement; Feb., 1, 1997; pp. 26–27*.

* cited by examiner

Primary Examiner—Hezron Wiliams
Assistant Examiner—John C. Hanley
(74) Attorney, Agent, or Firm—Kenyon & Kenyon

(57) ABSTRACT

A device for acceleration measurement, in which measuring signals from a two-dimensional sensor from measuring different directions are combined (gated) with one another and then jointly evaluated in an evaluation circuit. This evaluation is carried out, for example, using a threshold-value discriminator, in order to perform a plausibility check for a crash detection.

6 Claims, 2 Drawing Sheets

DEVICE FOR MEASURING ACCELERATION

BACKGROUND INFORMATION

From International Patent Publication No. WO 98/58264, it is already known to use a two-dimensional sensor element for measuring acceleration, the measuring signals being evaluated for the two different measuring directions by separate demodulators. For that reason, starting out from the related art, it is an underlying objective of the present invention to provide a simplified evaluation of the measuring signals from a two-dimensional sensor element.

SUMMARY OF THE INVENTION

The device according to the present invention for measuring acceleration has the advantage that a combination of the measuring signals from the various measuring directions is evaluated in one circuit, jointly and simultaneously. As a result, the outlay is considerably reduced. Particularly, in applications involving motor vehicle technology and, in this context, in crash sensing, crash plausibility is able to be simply determined when working with front-end-impact or side-impact sensors. In the case of front-end-impact and/or side-impact sensing, besides only one or a plurality of sensor(s) for the actual impact sensing, there is usually one additional, independent sensor for determining the plausibility of a crash-sensing signal. In this manner, the actual crash sensors are monitored for correct functioning.

It is particularly beneficial that for both measuring devices, clock-pulse generators are provided on the two-dimensional sensor element, and that the ratio of the frequency supplied by each of the two clock-pulse generators is even-numbered. In this manner, in an even clock cycle, the signals are obtained in phase, and the odd-numbered in antiphase.

It is furthermore beneficial that the evaluation circuit of the device according to the present invention has a threshold-value discriminator, so that the combination of the measuring signals from the various measuring directions is compared to a threshold value determined from experiments and simulations, in order to decide, when a triggering event is detected by the crash sensors, and its plausibility is to be determined, whether it is a question of an impact or not.

A further optimization is made possible by a combination with an additional acceleration sensor.

DETAILED DESCRIPTION

Acceleration sensors are being increasingly used in the motor vehicle industry. Such acceleration sensors are being manufactured more and more frequently from semiconductors, using micromechanics. In this context, a membrane is used as an acceleration-sensitive sensor element. Acceleration may be picked up in a surface in the X- and Y-directions using such a membrane.

In accordance with the present invention, such measuring signals are combined from measuring directions which are perpendicular to one another, and evaluated jointly and simultaneously in an evaluation circuit.

Figure 1:
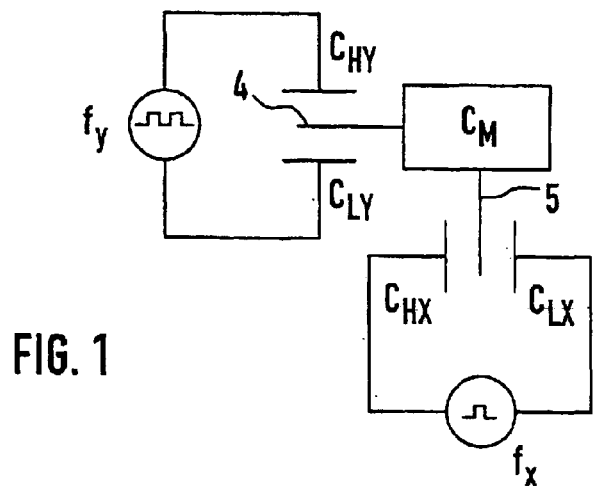
FIG. 1 shows a principle of operation of a two-dimensional sensor membrane.

FIG. 1 depicts the functioning method of a two-dimensional membrane. A membrane CM has two fingers 4 and 5, which, in an interdigital structure having external circuit elements, form two capacitors. Interdigital finger 4 forms a first capacitor CHY with the top electrode, and a second capacitor CLY with the bottom electrode. A clock signal having frequency FY is transmitted to the electrodes.

Interdigital finger 5 forms a first capacitor CHX with the left electrode, and a second capacitor CLX with a right electrode. Here, as well, a clock-pulse signal having a frequency FX is transmitted to the series connection of capacitors CHX and CLX. Therefore, interdigital fingers 4 and 5 provide a series connection of two capacitors. In a neutral position, interdigital fingers 4 and 5 are at neutral values in the middle between the particular electrodes. This middle is characterized by neutral values YO and XO, YO being the neutral value for interdigital finger 4, and XO the neutral value for interdigital finger 5.

Depending on which direction interdigital fingers 4 and 5 are deflected, the capacitances of capacitors CHY, CLY, CHX and CLX change. Since the distance between two electrodes is inversely proportional to the capacitance between the electrodes, in response to the movement of interdigital finger 4, capacitance CHY will increase in the direction of the top electrode, while the capacitance of capacitor CLY decreases, since the distance to the lower electrode increases to the same degree. This consideration applies likewise to interdigital finger 5 and to capacitors CHX and CLX.

Figure 2:
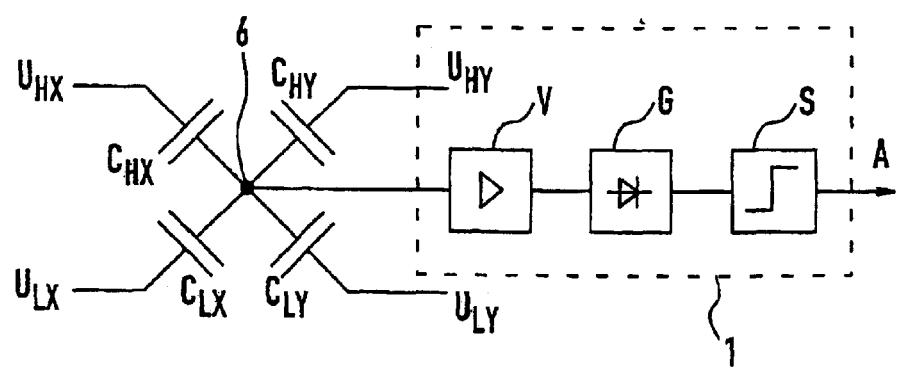
FIG. 2 shows a block diagram of the device according to the present invention.

FIG. 2 shows the device for acceleration measurement according to the present invention as a block diagram. In this context, an equivalent circuit diagram is provided where capacitors CHX, CLX, CHY and CLY shown in FIG. 1 are transposed to a circuit having a shared connection 6, from which a combination and, in fact, a summation of the measured signals, these being here tapped off voltages UHX, ULX, UHY and ULY, are evaluated jointly and simultaneously by an evaluation circuit 1. Initially, the combined measured signals are amplified by an amplifier V, here a charge amplifier having a basic-value filter being used. However, other amplifier circuits and amplifier types may also be used here. After that, a rectifier network G follows which maps the combined signal in terms of absolute value.

Since, as shown further below, depending on the clock cycle, the measuring voltages are added once, and, on the other hand, a subtraction of the measuring voltages is carried out, an amount of X+Y is present, on the one hand, and an amount of X−Y, on the other hand. The thus rectified, combined signal is then compared in a threshold-value discriminator S to a predefined threshold value to determine whether this value was exceeded or not. Thus, the side and front-impact detection, respectively, recognize whether a front or a side impact is present. Therefore, a more accurate sensor is rendered plausible. This evaluation signal, which therefore signifies whether there is an impact or not, is then present as output signal A. It is possible that more than one sensor signal is determined to be plausible in this manner.

Figure 3:
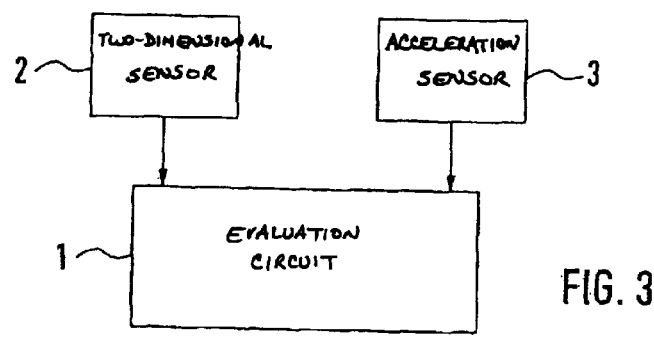
FIG. 3 shows a second block diagram of the device according to the present invention.

In FIG. 3, a second block diagram is depicted which represents the device according to the present invention for acceleration measurement. Besides the combined measuring signal from two-dimensional sensor 2, evaluation circuit 1 also receives a further acceleration signal, in this case from an acceleration sensor in the direction of travel.

Figure 4:
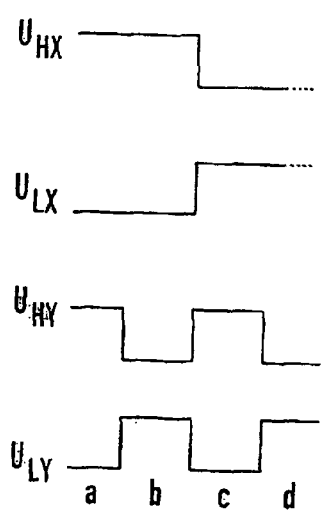
FIG. 4 shows the time relationships of the various measuring voltages for an even-numbered frequency ratio, selected here to equal two.

FIG. 4 illustrates the time relationships of the various voltages, measured across the capacitors. The voltages across capacitors CHX and CLX, here UHX and ULX, due to clock frequency FX, are clocked with half of the frequency at which voltages UHY and ULY are clocked. For that reason, four sections a, b, c and d may be distinguished here. For sections a and d, it holds that:

$$U_M \sim f\left(\frac{C_{HX} \cdot C_{HY}}{C_{LX} \cdot C_{LY}}\right) \sim f\left(\frac{x_0 - x}{x_0 + x} \cdot \frac{y_0 - y}{y_0 + y}\right) \approx f(x + y)$$

while for sections b and c, it holds that:

$$U_M \sim f\left(\frac{C_{HX} \cdot C_{LY}}{C_{LX} \cdot C_{HY}}\right) \sim f\left(\frac{x_0 - x}{x_0 + x} \cdot \frac{y_0 + y}{y_0 - y}\right) \approx f(x - y)$$

here, f denotes a functional relationship. This explains why different frequencies are used for the two clock-pulse generators.

What is claimed is:

1. A device for acceleration measurement comprising:
   a two-dimensional sensor element; and
   an evaluation circuit for processing signals from the sensor element, the evaluation circuit evaluating jointly and simultaneously a combination of the signals from accelerations in a first direction and a second direction, the first and second directions forming a right angle with respect to one another.

2. The device according to claim 1, further comprising first and second clock-pulse generators provided for the first and second directions, respectively, an even-numbered factor existing between first and second clock frequencies of the first and second clock-pulse generators, respectively.

3. The device according to claim 2, wherein the even-numbered factor is two.

4. The device according to claim 1, wherein the evaluation circuit includes a threshold-value discriminator to compare the combination to a threshold value.

5. The device according to claim 1, further comprising an acceleration sensor, the acceleration sensor providing a further input signal for at least one of combining with the signals of the sensor element and processing and evaluating by the evaluation circuit.

6. The device according to claim 4, wherein an output signal of the threshold-value discriminator is used to determine plausibility for a crash detection.

* * * * *